United States Patent Office 3,647,837
Patented Mar. 7, 1972

3,647,837
SYNTHESIS OF ORGANOLEAD COMPOUNDS
Kenneth C. Williams, Baton Rouge, La., assignor to Ethyl Corporation, New York, N.Y.
No Drawing. Filed Feb. 9, 1970, Ser. No. 9,984
Int. Cl. C07f 7/24
U.S. Cl. 260—437 R      12 Claims

ABSTRACT OF THE DISCLOSURE

A method of making organolead compounds and particularly the synthesis of tetraneopentyllead and hexaneopentyldilead from an inorganic lead (II) salt, and the use of said lead compounds for decreasing knock in internal combustion engines.

BACKGROUND OF THE INVENTION

Field of the invention

The present invention relates to organolead compounds and particularly to the synthesis of neopentyllead compounds from inorganic lead (II) salts. Such lead compounds are useful as antiknock compounds or gasoline additives and as an antifouling additive for marine paints.

Description of the prior art

Several previous attempts to prepare tetraneopentyllead from lead chloride have been unsuccessful. H. Zimer and O. A. Homberg, J. Org. Chem., 31, 947 (1966) and G. Singh, J. Org. Chem., 31, 949 (1966) reported unsuccessful attempts to prepare tetraneopentyllead from the reaction of neopentylmagnesium chloride with lead chloride. The only compounds isolated from the reaction were hexaneopentyldilead and trineopentyllead. Zimmer and Homberg were also unable to prepare tetraneopentyllead by the reaction of neopentylmagnesium chloride with trineopentyllead iodide. The only product they were able to obtain was hexaneopentyldilead.

An earlier investigation reported by K. C. Williams, J. Org. Chem., 32, 4062 (1967) disclosed an attempt to prepare tetraneopentyllead by the reaction of neopentylmagnesium chloride and lead tetraacetate. This reaction, however, produced only hexaneopentyldilead ad a trace of trineopentyl chloride.

G. Singh in J. Org. Chem., 11, 133–143 (1968) reported the preparation of tetraneopentyllead in almost quantitative yield from the reaction of neopentylmagnesium chloride with trineopentyllead bromide in diethyl ether.

It can therefore readily be seen that little success has been achieved in the synthesis of tetraneopentyllead and that such organo lead has not previously been prepared successfully from a lead (II) salt. The present invention is particularly designed to overcome this problem.

The present invention also provides a novel antiknock compound for internal combustion engines.

SUMMARY OF THE INVENTION

The present invention relates primarily to a method of making tetraneopentyllead from an inorganic lead II (salt). In the first step of the process, a lead halide or lead carboxylate is added to neopentylmagnesium halide in a solvent or catalyst such as tetrahydrofuran (THF) to produce a trineopentylplumbylmagnesium halide. This complex lead magnesium halide is then reacted with a neopentyl halide in a solvent or catalyst such as THF to produce quantitative yields of hexaneopentyldilead and/or tetraneopentyllead.

The invention may be illustrated by the following equations:

(1) $PbX_2 + 3(CH_3)_3CCH_2MgX' \rightarrow [(CH_3)_3CCH_2]_3PbMgX' + 2MgX_2$ (2) $[(CH_3)_3CCH_2]_3PbMgX' + (CH_3)_3CCH_2X'' \rightarrow [(CH_3)_3CCH_2]_4Pb + MgX'X''$ wherein X is either a halogen or a carboxylate, and X' and X'' are halogens.

The reactions are carried out at normal pressure and preferably at a temperature ranging from about −20° C. to about 50° C. Excellent results are achieved at a temperature of about 5° C.

Solvents and/or catalysts suitable for use in the instant invention are those ethers more basic than diethyl ether. Tetrahydrofuran is a preferred ether. Some examples of other ethers are the cycle ethers such as mono ethers having the formula:

wherein R is an unsubstituted alkylene radical, R' is an ethylene radical or an ethylenically unsaturated divalent hydrocarbon radical, >CHA or mixtures thereof; Z is a methylene radical, >NA or mixtures thereof; and, A is an aliphatic radical of from 1 to 10 carbon atoms. When Z is >NR, the ring will contain 6 members and Z and O will be 1,4 with respect to each other. The cyclic ether will contain up to 20 carbon atoms. Suitably there will be at least one hydrogen atom attached to each carbon atom in the ring. The cyclic ether may be substituted with radicals which will not react with the Grignard reagent, the lead halide or carboxylate, or the neopentyllead compounds. Suitable substituents are alkyl radicals such as ethyl, aryl radicals, such as phenyl, alkoxy radicals such as methoxy and aroxy radicals such as toloxy. The number of carbon atoms in the substituted radicals will be from 1 to 12, preferably from 1 to 8. Preferably the cyclic ethers will have from 5 to 6 atoms in their ring structure.

Suitable cyclic ethers are 3-ethyl-tetrahydrofuran, 2-(o-toloxy)tetrahydrofuran, N-methyl morpholine, the methyl ether of tetrahydrofurfuryl alcohol, e-phenoxy-tetrahydrofuran, 4-ethoxy-tetrahydrofuran, 2,5-dihydrofuran-tetrahydropyran, 4-methoxytetrahydropyran, 2-ethoxy-3,4-dihydro-2H-pyran, mixtures thereof and the like.

Other solvents may be added to the reaction; however, selection of the quantity and type of the solvent should be controlled in order that the reactants are not precipitated from solution. Suitable solvents are aliphatic ethers, glycolic ethers and cyclic diethers. All should be more basic than diethyl ether.

The solvent and/or ether should be present in an amount sufficient to keep the compounds in solution. In the first step or reaction, 10–20 mols of ether per mol of Grignard reagent are preferred and in the second step or reaction 30–60 mols of ether per mol of neopentyl halide are preferred. Greater amounts of solvent may be used if desired, but only increases the cost of the process.

Halogens suitable for use in the instant invention may be chlorine, bromine, and iodine.

Carboxylates suitable for use in the instant invention are those having the formula RCOO, wherein R=hydrogen, alkyl group, halogen-substituted alkyl group, hydroxy-substituted alkyl group, oxy-substituted alkyl group, thio-substituted alkyl group, cyano-substituted alkyl group, glyoxy-substituted alkyl group, aryl group, ethylenic-substituted alkyl group, and carboxy acid-substituted alkyl group.

The present invention also broadly relates to a method of decreasing the knock in internal combustion engines using tetraneopentyllead and hexaneopentyldilead. The complex lead compounds are added in small amounts to the fuel burned in the engine.

DESCRIPTION OF THE PREFERRED EMBODIMENT

In the preferred form of the present invention, neopentylmagnesium chloride is reacted with lead chloride at 5° C. in the presence of tetrahydrofuran to form trineopentylplumbylmagnesium chloride. The complex chloride is then reacted with neopentyl bromide to form good yields of hexaneopentyldilead and tetraneopentyllead.

Yields of over 90 percent hexaneopentyldilead can be obtained by using neopentyl iodide in lieu of neopentyl bromide.

The present invention is illustrated by the following examples:

GENERAL PROCEDURE

All reactions were carried out under a nitrogen atmosphere. Tetrahydrofuran (THF) was distilled from lithium aluminum hydride before use. Molecular weights were determined by the differential vapor pressure technique in benzene solution at 37° C. using a Mechrolab Model 302 vapor pressure osmometer.

The reactions were performed in a 500 ml. of 1000 ml. three-necker, round-bottom flask equipped with condenser (Dewar filled with Dry Ice-acetone) and magnetic or paddle stirrer. The lead salt was added from a 50 ml. round-bottom flask connected to the reaction vessel by a short piece of Gooch tubing Neopentylmegnesium chloride was prepared from magnesium turnings and a slight excess of neopentyl chloride. The reaction was initiated with ethylene dibromide at 60° C.; it was found that continued heating was necessary to complete the reaction.

All yields are reported as the percent conversion of lead chloride to the organolead product.

EXAMPLE I

Preparation of trineopentylplumbylmagnesium chloride

Neopentylmagnesium chloride was prepared from 4.0 g. (0.167 g.-atom) of magnesium turnings and an equivalent amount of neopentylchloride in 300 ml. of THF. The Grignard solution was treated slowly at 5° C. with 13.9 g. (0.05 m.) of lead chloride. A dark reddish-brown, homogeneous solution of the complex was obtained. Derivatives of the compound were prepared as described below.

EXAMPLE II

Reaction of trineopentylplumbylmagnesium chloride with neopentyl chloride

Trineopentylplumbylmagnesium chloride was prepared from 13.9 g. (0.05 m.) of lead chloride in 400 ml. of THF. To the complex was added 20 ml. of neopentyl chloride over a 15 minute period. The mixture was slowly warmed to 60° C. and stirred for two and one-half hours; during which time the color disappeared and a small amount of lead metal was formed. The mixture was hydrolyzed and more lead metal was formed. The THF was removed by distillation and the yellow solid which floated on the aqueous phase was extracted into petroleum ether (B.P. 37–54° C.). Evaporation of the petroleum ether yielded 13.8 g. (64.8% yield) of hexaneopentyldilead (M.P. 204–205° C.).

EXAMPLE III

Reaction of trineopentylplumbylmagnesium with neopentyl iodide

Trineopentylplumbylmagnesium chloride was prepared from 27.8 g. (0.1 m.) of lead chloride, in 500 ml. of THF. To the reddish-brown complex was added dropwise 20.0 g. (0.1 m.) of neopentyl iodide; the reddish-brown color of the complex disappeared within 15 minutes. The solution was warmed to ambient temperature and hydrolyzed with water. The THF was removed by distillation, and the yellow solid was extracted into petroleum ether. Evaporation of the ether yielded 41.5 g. (97.5% yield) of hexaneopentyldilead.

EXAMPLE IV

Reaction of trineopentylplumbylmagnesium chloride with neopentyl bromide

Trineopentylplumbylmagnesium chloride was prepared from 13.9 g. (0.05 m.) of lead chloride in 300 ml. of THF. To the complex was added 15 ml. of neopentyl bromide at −15° C. The cold batch was removed and the mixture was allowed to slowly warm to ambient temperature with stirring. The mixture was stirred at ambient temperature for 15 minutes, and then heated at reflux for 15 minutes; the solution retained some of its reddish-brown color and a small amount of lead metal was formed. The solution was hydrolyzed and the THF was removed by distillation. The yellow product was extracted into petroleum ether (B.P. 37–54° C.). Fractional crystalization from petroleum ether gave 13.3 g. (64%) of hexaneopentyldilead and 2.6 g. (11%) of tetraneopentyllead. The more soluble tetraneopentyllead was identified by comparison (melting point, nmr spectrum) and an authentic sample.

The reaction of neopentylmagnesium chloride with lead chloride in tetrahydrofuran as solvent produces a reddish-brown solution which is characteristic of trineopentylplumbylmagnesium chloride.

Although the invention is primarily directed toward the production of tetraneopentyllead, it also includes the making of hexaneopentyldilead as exemplified in Examples II and III hereinbefore.

In a preferred form of the invention, the complex lead compounds, tetraneopentyllead and tetraneopentyldilead, are added to hydrocarbon fuels, especially gasoline, in amounts sufficient to impart antiknock qualities to the fuel. Amounts of from about about 0.001% to about 2.0% by weight of fuel may be employed, with amounts of from about 0.01% to about 1.0% by weight of fuel being preferred. Greater or lesser amounts may be added without departing from the scope of the invention, depending upon the particular fuel to which the compound is added and the other additives in the fuel.

The complex lead compounds of this invention may be employed as the sole antiknock additive to the fuel, or they may be added to supplement other well known antiknock additives such as tetraethyllead and tetramethyllead.

The fuels suitable for use in practicing the present invention include liquid hydrocarbon fuels of the gasoline boiling range and include, for example, pure hydrocarbons, mixtures of hydrocarbons and blends of gasoline derived from straight run or processed naturally occurring hydrocarbons.

In addition to the complex lead compounds of this invention, fuels of this invention may contain other compounds which are normally added to liquid hydrocarbon fuels to improve the properties thereof. Antioxidants, dyes, corrosion inhibitors, other antiknock agents, and scavengers are added to the fuels of this invention.

The following examples in which all parts are parts by weight unless otherwise stated, illustrate typical fuel compositions within the scope of this invention:

EXAMPLE V

Ten parts of tetraneopentyllead are added with agitation to 1000 parts of a synthetic fuel consisting of 20 volume percent toluene, 20 volume percent of diisobutylene, 20 volume percent isooctane and 40 volume percent n-heptane. The resulting fuel has improved antiknock characteristics over a similar synthetic mixture containing no tetraneopentyllead.

EXAMPLE VI

Example V is repeated, except that the additive used is hexaneopentyldilead. Comparable results are obtained.

EXAMPLE VII

To 1000 parts of a commercial gasoline having a gravity of 59.0° A.P.I., an initial boiling point of 98° F., and a final boiling point of 390° F. and which contains 45.2 volume percent paraffins, 28.4 volume percent olefins, and 25.4 percent aromatics are added 20 parts of tetraneopentyllead and the mixture is thoroughly blended. The resulting fuel has improved antiknock characteristics over a similar fuel without the antiknock additive.

EXAMPLE VIII

Example VII is repeated, except that hexaneopentyldilead is used as the additive. Comparable results are obtained.

EXAMPLE IX

Tetraneopentyllead (TNPL) was tested for its antiknock qualities using standard industry procedures. TNPL was tested in Indolene at 1, 1½, 2 and 2½ grams Pb/gal. All blends contained a commercial "62" Mix Scavenger package. The results of the tests are shown in Table I hereinafter. TNPL is an effective antiknock additive for gasoline fuels.

TABLE I.—TETRANEOPENTYLLEAD (TNPL)

| Content | | | Motor octane No. (MON) | Research octate No. (RON) |
|---|---|---|---|---|
| Pb | Br | Cl | | |
| 1.05 | 0.49 | 0.92 | 91.1, 91.3 | 100.0, 100.0 |
| 1.54 | 0.47 | 1.02 | 92.1, 92.3 | 101.0, 101.7 |
| 1.99 | 0.45 | 1.02 | 92.7, 93.0 | 101.2, 101.2 |
| 2.53 | 0.49 | 1.01 | 93.8, 93.6 | 101.7, 101.6 |

Similar results are obtained using hexaneopentyldilead.

The present invention provides a new and improved method for making complex lead compounds such as tetraneopentyllead and hexaneopentyldilead.

The present invention further provides a novel antiknock compound for hydrocarbon fuels, especially gasoline, for internal combustion engines.

The description hereinbefore is illustrative and explanatory of the invention and various changes may be made therein without departing from the spirit of the invention or the scope thereof as set forth in the appended claims.

What is claimed is:

1. A method of making a complex organic lead compound wherein a quantity of a lead halide or lead carboxylate is reacted with a neopentylmagnesium halide in the presence of an ether more basic than diethyl ether and the organic lead magnesium halide produced thereby is reacted with a neopentyl halide in the presence of an ether more basic than diethyl ether to form at least one neopentyl lead compound, said ether in each reaction being present in an amount sufficient to keep the reactants in solution.

2. A method of making tetraneopentyllead and/or hexaneopentyldilead, comprising the steps of:
    (a) reacting a compound selected from the group consisting of a lead halide or lead carboxylate with a neopentylmagnesium halide in a solvent more basic than diethyl ether, said solvent being present in an amount sufficient to keep the reactants in solution to thereby form a complex neopentylplumbylmagnesium halide; and
    (b) reacting the complex neopentylplumbylmagnesium halide of the previous reaction with a neopentyl halide in a solvent more basic than diethyl ether, said solvent being present in an amount sufficient to keep the reactants in solution thereby producing quantitative amounts of tetraneopentyllead and/or hexaneopentyldilead.

3. A method of making tetraneopentyllead as illustrated by the following chemical equations:

(a) 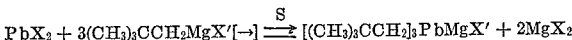

(b) 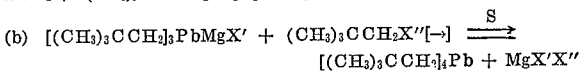

wherein X is either a halogen or a carboxylate, X' and X" are halogens and S is a solvent more basic than diethyl ether, said solvent being present in an amount sufficient to keep the reactants in solution.

4. The method of claim 3, wherein the solvent is tetrahydrofuran.

5. The method of claim 3, wherein the solvent is present in an amount of 10–20 mols of ether per mol of neopentylmagnesium halide in step (a) and in amount of 30–60 mols of ether per mol of neopentyl halide of step (b).

6. The method of claim 3, wherein the reactions are carried out at a temperature of from about −20° C. to about 50° C.

7. The method of claim 3, wherein the reactions are carried out at a temperature of about 5° C.

8. A method of making hexaneopentyldilead, comprising the steps of:
    (a) reacting neopentylmagnesium chloride and lead chloride in a solvent more basic than diethyl ether, said solvent being present in an amount sufficient to keep the reactants in solution to form trineopentylplumbylmagnesium chloride; and
    (b) reacting trineopentylplumbylmagnesium chloride and neopentyl chloride in an ether more basic than diethyl ether, said solvent being present in an amount sufficient to keep the reactants in solution to form quantitative amounts of hexaneopentyldilead.

9. A method of making hexaneopentyldilead comprising the steps of:
    (a) reacting neopentylmagnesium chloride and lead chloride in a solvent more basic than diethyl ether, said solvent being present in an amount sufficient to keep the reactants in solution to form trineopentylplumbylmagnesium chloride; and
    (b) reacting trineopentylplumbylmagnesium chloride and neopentyl iodide in a solvent more basic than diethyl ether, said solvent being present in an amount sufficient to keep the reactants in solution to form quantitatiive amounts of hexaneopentyldilead.

10. A method of making hexaneopentyldilead and tetraneopentyllead, comprising the steps of:
    (a) reacting neopentylmagnesium chloride and lead chloride in a solvent more basic than diethyl ether, said solvent being present in an amount sufficient to keep the reactants in solution to form trineopentylplumbylmagnesium chloride; and
    (b) reacting trineopentylplumbylmagnesium chloride and neopentyl bromide in a solvent more basic than diethyl ether, said solvent being present in an amount sufficient to keep the reactants in solution to form quantitative amounts of hexaneopentyldilead and tetraneopentyllead.

11. A method of making complex neopentyllead compounds comprising the steps of reacting a trineopentylplumbylmagnesium halide with a neopentyl halide in the presence of an ether more basic than diethyl ether, said ether being present in an amount sufficient to keep the reactants in solution, to form quantitative amounts of at least one neopentyllead compound.

12. The method of claim 11 wherein the reaction is carried out a temperature of from about −20° C. to about 50° C.

References Cited

UNITED STATES PATENTS 3,488,369   1/1970   Williams _____ 260—437 R

OTHER REFERENCES

Gilman et al.: J. Amer. Chem. Soc., vol. 61, pp. 731 to 738 (1939).

Zimmer et al.: J. Org. Chem., vol., 31, pp. 947–9 (1966).

Singh: J. Org. Chem., vol. 31, pp. 949–50 (1966).

Singh: J. Organometal. Chem., vol. 11, pp. 133–143 (1968).

Singh: Tetrahedron Letters, No. 36, pp. 4309–4313 (1966).

TOBIAS E. LEVOW, Primary Examiner

H. M. S. SNEED, Assistant Examiner

U.S. Cl. X.R.

44—66